Nov. 17, 1936.　　　　J. A. BENT　　　　2,060,784
ENGINE MOUNTING
Filed Feb. 10, 1934　　　2 Sheets-Sheet 1
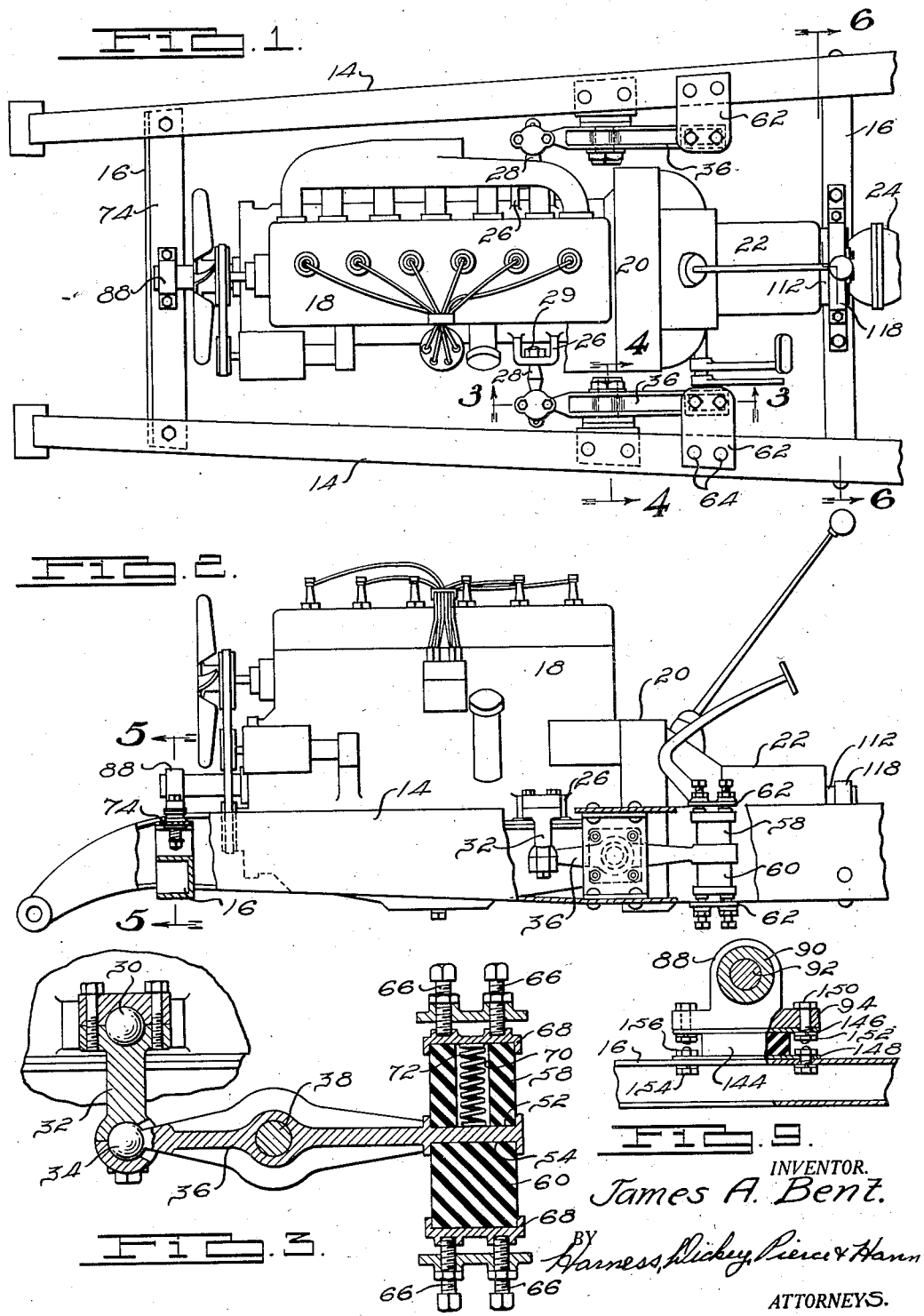
INVENTOR.
James A. Bent.
BY Harness, Dickey, Pierce & Hann
ATTORNEYS.

Nov. 17, 1936.    J. A. BENT    2,060,784
ENGINE MOUNTING
Filed Feb. 10, 1934    2 Sheets-Sheet 2
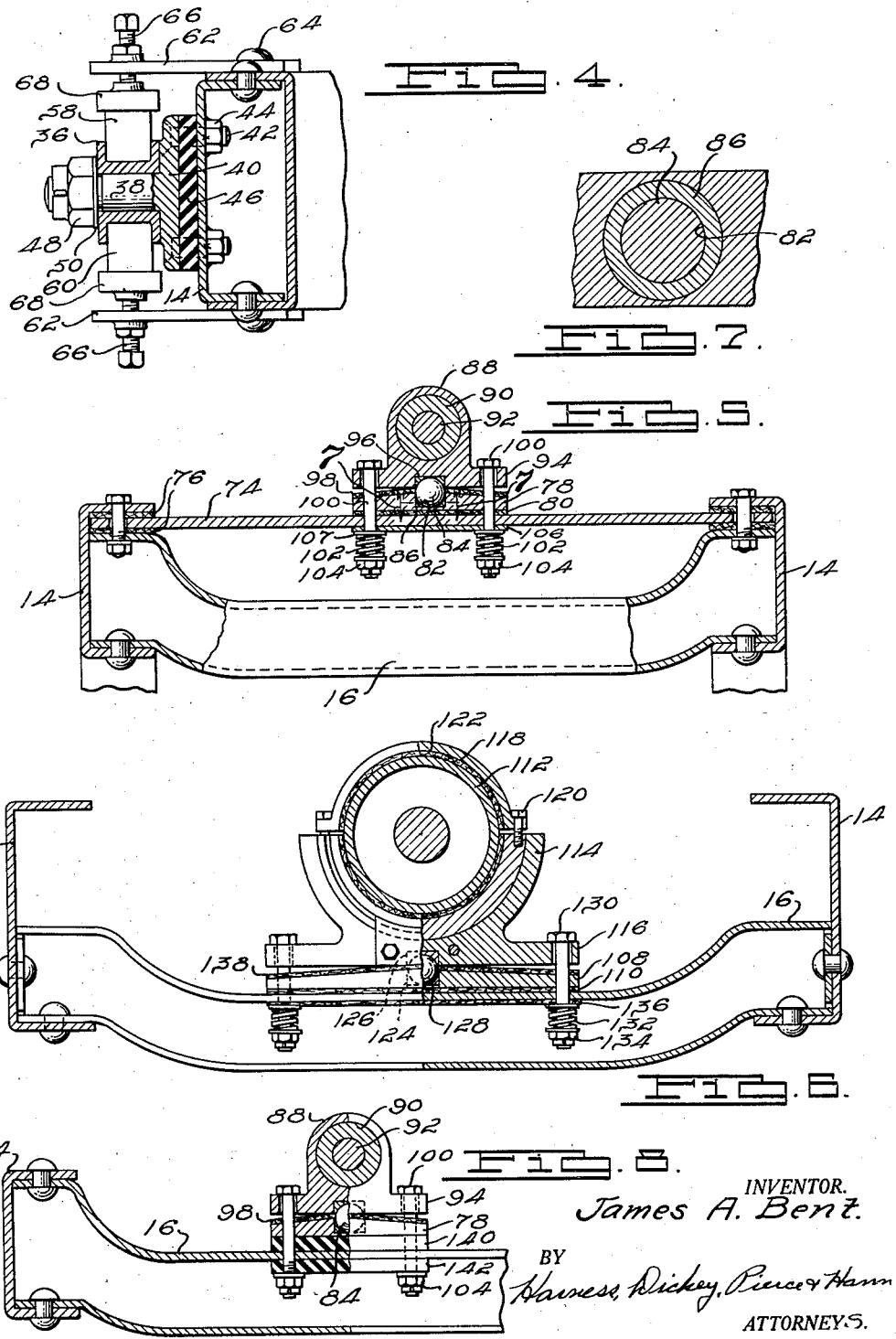

Patented Nov. 17, 1936

2,060,784

UNITED STATES PATENT OFFICE 2,060,784

ENGINE MOUNTING

James A. Bent, Detroit, Mich.

Application February 10, 1934, Serial No. 710,626

6 Claims. (Cl. 248—7)

This invention relates to motor vehicles and particularly to means for mounting the power plant therein, the principal objects being the provision of a novel means for mounting a power plant in a motor vehicle whereby the vibratory movements of the engine are prevented from being sensibly transmitted to the frame of the vehicle, and is an improvement in the construction shown and described in the application for Letters Patent of the United States filed March 25, 1933 by William Harold Bagley, Jr. for Improvements in motor mounting, Serial No. 662,685, Patent No. 2,001,562 of May 14, 1935.

Objects of the invention include means for movably supporting the weight of a power plant in a motor vehicle in a plane passing transversely through the power plant at approximately the center of mass thereof; the provision of means for supporting the power plant of a motor vehicle in the vehicle frame in a transverse plane approximately passing through the center of gravity of the power plant together with means for yieldingly resisting the excessive movement of the end portions of the power plant; the provision of means for supporting the greater proportion of the weight of the power plant of a motor vehicle in a plane extending transversely of the length thereof and approximately through the center of mass thereof and providing means adjacent at least one end of the power plant permitting such end a limited amount of movement in both a transverse and vertical direction but resisting excessive movements of such end in such direction.

Further objects include the provision of novel means for supporting the power plant of a motor vehicle for rocking movement about a line extending in a generally longitudinal direction with respect thereto including a pair of rockable levers or arms carried by the frame of the vehicle one end of each of which is connected to the power plant of the vehicle for the purpose of supporting a proportion of the weight thereof and the opposite end of each of which is provided with associated means for resiliently resisting the rocking movements of the arm or lever; the provision of a novel form of connection between such rockable arm and the power plant; and the provision of a novel form of resilient means for resiliently resisting the rocking movement of the arms or levers.

Further objects include the provision of a novel form of means permitting movement of an end of the vehicle power plant in various directions while preventing excessive movements of such end in such direction and the provision of a novel form of means yieldingly resisting excessive movement of the end of a motor vehicle power plant and adapted to insulate or deaden sounds or other vibratory movements in the engine in their transmission to the vehicle frame.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary plan view of the forward end of a motor vehicle showing the power plant thereof mounted in the frame thereof.

Fig. 2 is a partially broken, partially sectioned side elevational view of the motor vehicle shown in Fig. 1.

Fig. 3 is an enlarged vertical sectional view taken centrally through one of the supporting arms and associated parts as on the line 3—3 of Fig. 1.

Fig. 4 is an enlarged vertical sectional view taken centrally through the pivotal axis of one of the supporting arms as on the line 4—4 of Fig. 1.

Fig. 5 is an enlarged vertical sectional view taken on the line 5—5 of Fig. 2 and illustrating the guiding and/or supporting means for the forward end of the power plant.

Fig. 6 is an enlarged vertical partially broken, partially sectioned view taken as on the line 6—6 of Fig. 1 and illustrating the supporting and/or guiding means for the rear end of the power plant.

Fig. 7 is an enlarged, fragmentary, horizontal sectional view taken on the line 7—7 of Fig. 5, to better illustrate the seat for the ball member thereof.

Fig. 8 is a fragmentary partially broken view similar to Fig. 5 and showing a modified construction therefor.

Fig. 9 is a fragmentary partially broken, partially sectioned view illustrating another modified construction for guiding and/or supporting the forward end of the power plant.

Referring to the drawings and particularly to Figs. 1 and 2, there is indicated a vehicle chassis frame including frame side rails 14 and frame cross members 16 which serve to support the unitary power plant of the motor vehicle including an internal combustion engine indicated generally as at 18, a flywheel and clutch included within the housing 20 fixed to the rear end of the engine 18, and a change speed or transmission mechanism included within the housing 22 fixed to the rear face of the clutch housing 20. This unitary power plant will hereinafter be referred to as the power plant or power unit. A propeller shaft, not shown, is connected by a universal joint indicated generally as at 24 with the transmission mechanism 22 in accordance with conventional practice.

In accordance with the present invention substantially the entire weight of the power unit including the engine, clutch and transmission is transmitted to the frame of the vehicle by means connected to the power plant at points located approximately in a vertical plane extending through the engine in a direction perpendicular to the axis of the crank shaft thereof and approximately passing through the center of mass of the power plant, and such means are constructed so as to permit a limited amount of rocking movement of the power plant about a line extending in a generally longitudinal direction with respect to the power plant and which may coincide, as a matter of illustration only, with the axis of the engine crank shaft. Means are provided at at least one end of the power plant which will not only permit substantial rocking movement thereof but additionally will permit a limited amount of movement of the ends of the power plant in a direction perpendicular to the axis of the crank shaft thereof, such means being provided principally for the purpose of preventing excessive movement of such ends of the power plant although they may support a minor proportion of the weight thereof.

The means forming the main weight supporting structure for the power plant is preferably patterned after the similar structure disclosed in the above identified Bagley application but as disclosed herein includes certain inventive features not disclosed in said application. This supporting structure includes a pair of brackets 26 one on each side of the engine 18 and preferably formed integrally with the crank case thereof. An outwardly projecting arm 28 is rigidly fixed to each of the brackets 26 as by means of a nut 29, the axes of the arms 28 preferably being aligned with each other and located in a vertical plane passing through the engine 18 in perpendicular relation with respect to the axis of the crank shaft thereof and passing through the center of mass of the power plant including the engine 18, clutch 20 and transmission 22. The center of mass of the power plant may, of course, be found by a number of different methods well known to those skilled in the art, the easiest and most practical of which probably is to hang the power plant in a sling and adjust the sling lengthwise of the power plant until when the power plant is lifted by the sling it retains its normal horizontal position.

The outer end of each arm 28 is formed to provide a ball 30 as indicated best in Fig. 3 and the ball 30 is connected by a vertically extending link 32 with a ball end 34 of a double arm lever 36 extending in approximately parallel relation to the corresponding frame side member 14 and pivotally mounted upon a pin 38 for movement in a vertical plane. As best indicated in Fig. 4, the pin 38 is formed integrally with a pad or flange 40 secured to the corresponding frame side member 14 by bolts 42 and nuts 44. A pad 46 of rubber or other resilient or yielding sound insulating material coextensive in size with the pad 40 is preferably interposed between each pad 40 and the corresponding frame side member 14 in order to allow the pin 38 to yield a limited amount and to lessen the transmission of vibrations between the pad 40 and the frame. A nut 48 threaded on the outer end of each pin 38, in conjunction with a washer 50, maintains the levers 36 against axial displacement on the pins 38.

The opposite or rear end of each arm 36 is provided with an upwardly and a downwardly opening recess or pocket 52 and 54 respectively in which rubber blocks 58 and 60 respectively seat. Brackets 62 secured to the upper and lower flanges respectively of each of the frame side members 14 as by means of rivets 64 project inwardly to a point above and a point below the pockets 52 and 54 and in line with these pockets each is provided with a pair of vertically directed threaded openings in each of which a screw 66 is threadably received. The inner end of each of the screws 66 is socketed in a cap member 68 fitting over the corresponding ends of the corresponding rubber blocks 58 and 60.

The weight of the power plant in being transmitted to the arms 28 and links 32 to the forward end of the double arm levers 36 tends to cause the forward ends of the levers 36 to move downwardly about the corresponding pins 38 and tend to move the rear ends of the levers 36 upwardly. This tendency toward upward movement of the rear ends of the double arm levers 36 is opposed by compression of the upper blocks 58. In practice the upper screws 66 are threaded downwardly preferably until the upper blocks 58 are compressed to such an extent as to normally hold the double arm levers 36 in approximately horizontal position. The lower screws 66 are also threaded upwardly so as to compress the lower blocks 60 to such an extent that the upper ends of the blocks 60 will always remain in contact with the bottom of the pocket 54 when the rear ends of the levers 36 move upwardly to the maximum extent of their movement in service so that no separation of the blocks 60 with either their lower or upper abutments will ever occur in service. Accordingly, it will be recognized that the upper screws 66 must be threaded downwardly a sufficient distance not only to sustain the weight of the power plant through compression of the upper blocks 58 and maintain the levers 36 in substantially horizontal relation, but additionally must also be threaded downwardly sufficiently to overcome the force of compression of the block 60 tending to move the levers 36 out of such normally horizontal position.

From the construction thus far described and considering the entire weight of the power plant as being supported through the arms 36, it will be apparent that when torque reactions are set up in the engine 18 tending to rotate the power plant about the axis of the engine crank shaft, an added downward pressure will be applied to the forward end of one of the levers 36 and a reduction in pressure will occur at the forward end of the opposite lever 36, and such change in pressures acting upon the blocks 58 and 60 will cause such blocks to yield and permit rocking of the levers 36 about their respective pins 38, such rocking movement of course permitting a corresponding rocking movement of the entire power plant about the engine crank shaft axis or other longitudinally extending line. This rocking movement of the power unit has the effect of toning down or reducing the intensity of the torque reactions and to spread out the time elements through which such torque reactions take place, and acts to merge the various torque reactions into one another so that their combined reactions on the chassis frame of a vehicle is more or less like a steady pressure and not apparent in the vehicle frame or body as separate and distinct reactions or vibrations.

In view of the fact that the upper blocks 58 not only must sustain the weight of the power plant through compression set up in them but also balance the compression of the blocks 60 and yieldably resist the torque reactions in the engine, it may be desirable, particularly in power plants of the heavier type, to supplement the upper blocks 58 by yieldable metallic means such, for instance, as one or more coil springs compressed simultaneously therewith and which may or may not be molded directly in such rubber blocks. An example of such a construction is illustrated in Fig. 3 in which the block 58 is shown as being provided with a central bore 70 in which a coil spring 72 is received with its lower end resting against the bottom of the pocket 52 and its upper end resting against the upper cap 68. Initially the spring 72 may be of the same free length as the free length of the block 58 or, if desired, it may be provided with either a greater free length than the free length of the block 58 or a lesser free length than the free length of the block 58 so that either it or the block 58 will be initially compressed upon downward threading of the upper screws 66, as the respective case may be, before the other is also subjected to the operation of being placed under compression. By employment of springs such as 72 or equivalent means, the reaction characteristics of the upper blocks 58 may be varied to best suit the condition of operation of the power plant with which they are employed.

Torque reactions in an engine tend to rock the engine about a generally longitudinally extending line which may coincide with the axis of the engine crankshaft or may be located somewhere between the crankshaft axis and the center of mass of the engine. There are additional unbalanced forces in an operating engine caused, for instance, by the movements of the crankshaft, connecting rods and/or pistons which tend to move the end portions of the engine and/or power plant of which it forms a part in any one or more of a plurality of paths located in a direction transverse to the axis of the engine crankshaft and about the center of mass of the engine and/or power plant. Not only does the supporting means hereinbefore described permit rocking of the power plant due to torque reactions in the engine, but particularly in view of the fact that the line of support for the power plant is included in a plane perpendicular to the engine crankshaft and approximately passing through the center of mass of the power plant it will be apparent that if the ends of the power plant are permitted to move under the influence of the additional forces mentioned, the perceptible effects of such forces in the frame of the vehicle will be negligible due to the fact that the movement of the power plant caused by them is proportional to the distance from the center of mass of the engine and the supporting means herein provided tones down and dissipates the effects of such forces in their transmission to the frame. If it were attempted to restrain the movement of the end portions of the power plant relative to the frame such forces would, of course, immediately become apparent in the frame due to their being resisted thereby so that although it is desirable to provide some means at at least one end of the power unit to limit maximum movement thereof with respect to the frame, I have found it desirable that such means be so constructed as to permit relatively free movement of such ends laterally of the axis of the crank shaft within the normal limit of movement of such engine of the power unit as may normally be expected to be caused by such additional forces. As before mentioned, although such means provided for limiting the maximum movement of the ends of the power unit may be provided substantially solely for such purpose from a practical standpoint, they may be called upon to a greater or lesser extent to share or aid in sustaining a portion of the weight of the power unit, but preferably a relatively small portion if any.

Referring now to Fig. 5 to show merely by way of illustration suitable means for restraining completely free lateral movement of the forward end of the power plant illustrated in Fig. 1, it will be noted that a flat or leaf spring member 74 bridges the upper outer ends of the front cross member 16. The ends of the leaf spring member 74 are preferably insulated from direct metallic contact with the frame side members 14 and front cross member 16 by blocks or sheets 76 of non-metallic material which may be of a relatively non-yieldable material such as conventional types of brake lining or may be of a yieldable nature such as felt, rubber or material having similar properties. A block or plate 78 is centrally supported upon the upper face of the member 74, preferably with the interposition of a pad 80 between it and the upper face of the member 74 formed from a non-metallic material of any one of the types previously mentioned. The block 78 is centrally provided in its upper face with an upwardly opening semi-spherical recess 82 in which a hardened ball 84 is received. Preferably, the recess 82 is formed in a cylindrical plug 86 formed of hardened material and inset into the upper face of the plate 78. The upper face of the plate 78, as particularly well illustrated in Fig. 5, slants downwardly from the ball 84 in the direction of the frame side members 14, in other words, its thickness varies from a maximum at the ball 84 to a minimum adjacent its outer side edges, this being for a purpose which will presently become apparent.

A bracket member 88 rotatably surrounding the forwardly extending hollow cylindrical projection 90 fixed to the forward end of the engine 18 about the engine crank shaft 92 is provided with a flange or base 94 of a size coextensive with the plate 78 and its lower flat face is provided with an insert 96 which may be considered substantially identical to the insert 86 and in which seats the upper portion of the ball 84. With this construction it will be apparent that, because of the rotatable nature of the connection between the bracket 88 and the projection 90, rocking movement of the power plant about the axis of the engine crank shaft 92 will be unrestricted because of such connection and, due to the fact that the bracket 88 may rock laterally about the center of the ball 96, a limited amount of transverse movement of the forward end of the power plant will be permitted. The amount of permissible lateral movement of the forward end of the power plant will, of course, depend to a greater or lesser extent upon the angularity existing between the upper face of the plate 78 and the lower face of the flange 94 on the bracket 88 but, inasmuch as such movement to the forward end of the engine and/or power plant due to unbalanced or other usual conditions in the engine seldom exceeds 10 or 15 one thousandths of an inch, it will be apparent that the amount of angularity shown will be ample to take care of such movement. Unusual conditions may occur during operation of the vehicle which will tend to cause a greater amount of lateral movement of the forward end of the power plant, as for instance unusually rough conditions of the road surface over which the vehicle is traveling, and accordingly in order to prevent contact of the lower face of the flange 94 with the upper face of the plate 78 in limiting such excessive movements from being audible in such cases, I prefer to insert a strip 98 of material between such faces and which material is preferably of a non-metallic nature of any of the types previously described. It will also be apparent that where such strip 98 of material is employed it will be necessary that the depth of the recesses in the inserts 86 and 96 be sufficiently less than the radius of the ball 84 to permit full seating of the ball 84 in both inserts and provide the required clearance for the strip 98 between the plate 78 and flange 94.

In order to prevent displacement of the plate 78 and bracket 88 with respect to the member 74 and to each other, bolts 100 are preferably employed to yieldingly tie them together. The bolts 100 preferably relatively closely fit the openings in the member 74 and plate 78 through which they project but are provided ample clearance in the flange 94 of the bracket 88 so as not to interfere with the desired rocking movement of the bracket 88 about the center of the ball 84. Surrounding the bolts 100 below the member 74 are coil springs 102 constantly maintained under compression by nuts 104. A sheet 106 of non-metallic material of any one of the types previously described is preferably interposed between the lower face of the member 74 and the upper ends of the springs 102 and in such case washers 107 are preferably provided for the upper ends of the springs 102 in order to prevent them from cutting into the sheet 106. The springs 102 tend to normally maintain the bracket 88 with its flange 94 in the horizontal position indicated, but, as will be apparent, the springs 102 readily permit the bracket 88 to rock about the center of the ball 84 in order to permit the forward end of the power plant to move laterally in response to unbalanced conditions in the engine.

Where the pad or sheet 80 and 106, and particularly the pad 80, are of sufficient thickness and formed of rubber or felt of sufficient yieldability, then the block 78 may be allowed sufficient vertical movement to take care of such vertical movement of the forward end of the power plant as may be caused by unbalanced conditions in the engine and in such case the member 74 may be substantially rigid. In case, however, the thickness and resilient characteristics of the member 80 in particular are not sufficient to fully take care of such vertical movement of the forward end of the power plant, then the member 74 is so constructed as to provide sufficient flexibility in order to take care of such vertical movement, it being understood of course that while the member 74 may be of such flexibility as to permit the slight amount of vertical movement of the front end of the power plant due to ordinary unbalanced conditions in the engine, it is preferably of such rigidity as to restrict the forward end of the power plant against excessive vertical movement, and particularly in some cases, of sufficient rigidity to aid in supporting the mass of the power plant.

By the construction illustrated in Fig. 5 it will be apparent that the forward end of the power plant is permitted a limited amount of relatively free movement both laterally and vertically so as to permit the forward end of the crank shaft to move in any geometrical configuration in a plane transverse to the axis of the crank shaft as may be required under the influence of the unbalanced or other usual forces in the engine, and yet it restricts the forward end of the power plant from excessive movement in any such direction.

The means provided at the rear end of the power plant for limiting excessive movement thereof, and in some cases for additionally supporting a proportion of the weight of the power plant, may be substantially identical in general principles of design to that employed at the front end of the vehicle as described in connection with the construction shown in Fig. 5, but I have found it unnecessary in most cases to provide a resilient member such as the member 74 in Fig. 5 for the reason that the rear support is at such a distance from the engine proper that the vibration in the power plant due to unbalanced conditions in the engine itself are apparent to a much lesser extent at such end of the power plant. Accordingly, I have found it sufficient to modify the front construction shown in Fig. 5 in the manner illustrated in Fig. 6 in which it will be noted that a plate member 108, which may be substantially identical to the plate member 78 described in connection with Fig. 5, is mounted directly upon the frame cross member 16 at the rear end of the transmission 22 with a strip 110 of non-metallic material of the type previously described interposed between it and the cross member 16. As indicated in Figs. 1 and 2, the rear end of the transmission 22 is provided with a cylindrical rearward extension 112 and a bracket member 114 corresponding to the bracket member 88 previously described and provided with a flange 116 corresponding to the flange 94 of the bracket 88 rotatably receives the cylindrical extension 112. In this case the bracket 114 is split and its upper half comprises a cap member 118 secured to the main body portion thereof as by screws 120. Preferably a strip 122 of non-metallic material which may be similar to brake lining, graphite impregnated fabric or other suitable material is interposed between the extension 112 and the bracket 114 to insulate these parts against the direct transfer of audible sounds between them. This construction includes hardened inserts 124 and 126 in the plate 108 and flange 116 and cooperating ball 128 corresponding to the inserts 86 and 96 in ball 84 respectively previously described in connection with Fig. 5. It also includes bolts 130 corresponding to the bolts 100, springs 132 corresponding to the springs 102, nuts 134 corresponding to the nuts 104, and strip 136 corresponding to the strip 106 previously described in connection with Fig. 5. This construction thus permits the rear end of the transmission 22 to pivot in the brackets 114 about the axis of the crank shaft and also to rock about the axis of the ball 128. A strip of non-metallic material 138 disposed between the plate 108 and flange 116 serves the same purpose as the strip 98 described in connection with Fig. 5. Possible vertical movement of the rear end of the power plant under the influence of unbalanced or other usual forces in the engine may be taken care of in the resiliency of strips 110 and 136 as well as the strip 122.

In Fig. 8 is illustrated a modification of the construction illustrated in Fig. 5 modified as suggested in the description of Fig. 5. In this case the same members 78, 88, 90, 92, 94, 98 and 104 are employed the same as in Fig. 5 but in this case the plate 78 is mounted directly upon the frame member 16 instead of upon a spring member 74 in Fig. 5. Also in this case the strip 80 is replaced by a relatively thick block 140 of resilient material such as rubber or felt and the strip 106 is replaced by a similar block 142, and the springs 102 are eliminated entirely. With this construction the thickness of the blocks 140 and 142 are such and the material from which they are made is sufficiently resilient to permit the desired vertical movement of the front end of the power plant in response to the normally unbalanced forces in the engine. Obviously, the construction illustrated in Fig. 6 may be modified in the same manner. The ultimate result of the construction illustrated in Fig. 8 will of course be substantially similar to that illustrated in Fig. 5.

In Fig. 9 another modification of the construction shown in Fig. 5 is illustrated. As shown, this modification includes the same bracket 88 as in Fig. 5 but the plate member 78, ball 84, bolts 100 and springs 102 are eliminated entirely and in place thereof is provided a relatively thick block 144 of rubber. This block of rubber 144 has vulcanized or otherwise suitably secured to its upper and lower faces respectively a pair of metal plates 146 and 148. The plates 146 and 148 are coextensive in size with the lower face of the flange 94 of the bracket 88 and the block 144 is of sufficiently lesser width as to permit the opposite end of the plates 146 and 148 to project therepast. Bolts 150 and cooperating nuts 152 cooperate to secure the projecting ends of the plate 146 to the flange 94 and bolts 154 and nuts 156 cooperate to secure the projecting ends of the plate 148 directly to the front cross member 16. With this construction the block 144 of rubber is of sufficient thickness and resiliency to permit both vertical and lateral movements of the forward end of the crank shaft 92 to permit the normal movements of the front end of the power plant due to the usual unbalanced or other forces in the engine. Obviously, the ultimate effect of this construction will be substantially identical to that described in connection with Fig. 5. It will also be observed that this same type of construction may be employed in connection with the rear end of the power plant in place of that shown and described in connection with Fig. 6.

From the foregoing description it will be apparent that by the present invention means are provided for mounting a unitary power plant of the motor vehicle in the frame thereof including means connected to the power plant in a plane transverse to the axis of the crank shaft of the engine thereof and approximately including the center of mass of the power plant which resiliently supports substantially the entire weight of the power plant. It will further be apparent that such means are so constructed as to permit a limited amount of rocking movement of the power plant about a line extending in a generally longitudinal direction with respect thereto, together with means for resisting excessive movements of the ends of the power plant in directions perpendicular to the axis of the crank shaft yet permitting substantially free movement of such ends of the power plant in such direction under the influence of the normally unbalanced or other usual forces in the engine whereby the effects of such vibratory movements of the power plant due to such unbalanced or other usual forces are transmitted to the frame of the vehicle substantially entirely through the main power plant support which, being located transversely to and adjacent the center of mass of the power plant and being of a character to dissipate the effects of such vibrations in their transmission to the frame of the vehicle, substantially eliminates the effect of any vibratory movement of the engine due to operating characteristics thereof from being sensibly transmitted to the frame of the vehicle. It therefore provides a construction in which the effects of normal vibratory movement in the power unit of the vehicle are substantially eliminated as far as sensible effects upon the occupants of the vehicle is concerned.

It is to be understood that in the broader aspects of the present invention the specific features of construction herein shown and described are provided mainly for the purpose of illustration only and that, accordingly, formal changes may be made in the specific embodiments of the invention described without departing from the spirit or substance of the broad invention, the scope of which is commensurate with the appended claims.

I claim:

1. In combination with a motor vehicle having a chassis frame including side members and a unitary power plant including an engine, clutch and transmission mechanism, means for supporting said power plant in said frame including a pivot pin mounted upon each of said side members, a pad of yieldable non-metallic material insulating each of said pins from the corresponding of said side members, a lever pivoted upon each of said pins, means connecting each of said levers with said power plant, and means interposed between said levers and said frame yieldingly supporting said power plant for rocking movement about a generally longitudinally extending line by yieldingly resisting rocking movement of said levers about their respective pivot pins.

2. In combination with a motor vehicle having a chassis frame and an engine, a connection between said frame and said engine including a member supported by said frame and having a recess in the upper face thereof, a member pivotally secured to said engine and having a recess in the lower face thereof, and anti-friction means received between said recesses and normally maintaining said members in spaced relation.

3. In combination with a motor vehicle having a chassis frame and an engine, a connection between said frame and said engine including a member supported by said frame and having a recess in the upper face thereof, a member pivotally secured to said engine and having a recess in the lower face thereof at a point vertically spaced from the line of pivot thereof, and anti-friction means received between said recesses and normally maintaining said members in spaced relation.

4. In combination with a motor vehicle having a chassis frame and an engine, a connection between said frame and said engine including a member supported by said frame and having a recess in the upper face thereof, a member secured to said engne and having a recess in the lower face thereof, said faces normally bearing a diverging relation with respect to each other, anti-friction means received between said recesses and normally maintaining said members in spaced relation, and sound insulating means disposed between said faces.

5. In combination with a motor vehicle having a chassis frame and a power plant, a connection between said power plant and said frame including a first member, a second member pivotally associated with said first member and pivotally associated with said power plant at a point vertically spaced from its point of pivotal connection with said first member, and a yieldable connection between said first member and said frame permitting a limited vertical movement of said first member relative to said frame.

6. In combination with a motor vehicle having a chassis frame and a power plant, a connection between said power plant and said frame including a first member, a second member pivotally associated with said first member and pivotally associated with said power plant at a point vertically spaced from its point of pivotal connection with said first member, and spring means interposed between said first member and said frame permitting a limited amount of vertical movement of said first member relative to said frame.

JAMES A. BENT.